US007377851B2

(12) United States Patent
Goto et al.

(10) Patent No.: US 7,377,851 B2
(45) Date of Patent: *May 27, 2008

(54) OPERATING DEVICE FOR GAME MACHINE

(75) Inventors: Teiyu Goto, Saitama (JP); Hiroki Ogata, Osaka (JP)

(73) Assignee: Sony Computer Entertainment Inc. (JP)

( * ) Notice: Subject to any disclaimer, the term of this patent is extended or adjusted under 35 U.S.C. 154(b) by 359 days.

This patent is subject to a terminal disclaimer.

(21) Appl. No.: 11/076,490

(22) Filed: Mar. 9, 2005

(65) Prior Publication Data
US 2005/0176506 A1    Aug. 11, 2005

Related U.S. Application Data

(63) Continuation of application No. 10/687,372, filed on Oct. 16, 2003, now Pat. No. 6,887,158, which is a continuation of application No. 09/818,363, filed on Mar. 27, 2001, now Pat. No. 6,682,426, which is a continuation of application No. 09/091,121, filed on Sep. 24, 1998, now Pat. No. 6,231,444.

(30) Foreign Application Priority Data
Oct. 11, 1996    (JP)    ..................... 8-30240

(51) Int. Cl.
    A63F 13/02    (2006.01)
(52) U.S. Cl. ..................... 463/37; 273/148 B
(58) Field of Classification Search ............ 463/36–37; 273/148 B
    See application file for complete search history.

(56) References Cited

U.S. PATENT DOCUMENTS 5,036,239 A    7/1991    Yamaguchi (Continued)

FOREIGN PATENT DOCUMENTS

EP    0 682 350 A2    11/1995

(Continued)

OTHER PUBLICATIONS

"Sign of Evolution in Controller; Advent of Analog Pad", Game Walker, Kadokawa Shoten Publishing Co., Ltd., Feb. 1997, vol. 4, No. 2 (Whole No. 28), p. 24.

Primary Examiner—Robert E. Pezzuto
Assistant Examiner—Alex F. R. P. Rada, II
(74) Attorney, Agent, or Firm—Lerner, David, Littenberg, Krumholz & Mentlik, LLP

(57) ABSTRACT

An operating device used in a game machine for playing a television game includes a main body portion and first and second grip portions protruding from one side of the main body portion. A first operating unit is mounted on one end of the main body portion and a second operating unit is mounted on the opposite end of the main body portion. The first and second operating units are each provided with at least one signal input element operable to generate a signal. A third operating unit and a fourth operating unit are mounted to the main body portion adjacent the first and second grip portions. Each of the third and fourth operating units has at least one signal input element operable to generate a signal. When the first and second grip portions are gripped, the third and fourth operating units can be manipulated by the thumb of the hand gripping the first or second grip portion, respectively. The operating device further includes a vibration imparting mechanism for imparting vibrations to the user's hands.

12 Claims, 14 Drawing Sheets

U.S. PATENT DOCUMENTS

| | | |
|---|---|---|
| 5,059,958 A | 10/1991 | Jacobs et al. |
| 5,542,672 A | 8/1996 | Meredith |
| 5,643,087 A | 7/1997 | Marcus et al. |
| 5,669,818 A | 9/1997 | Thorner et al. |
| 5,691,898 A | 11/1997 | Rosenberg et al. |
| 5,716,274 A | 2/1998 | Goto et al. |
| 5,734,373 A | 3/1998 | Rosenberg et al. |
| 5,742,278 A * | 4/1998 | Chen et al. .................. 345/156 |
| 5,759,100 A | 6/1998 | Nakanishi |
| 5,820,462 A * | 10/1998 | Yokoi et al. ................... 463/37 |
| 5,853,326 A | 12/1998 | Goto et al. |
| 5,897,437 A * | 4/1999 | Nishiumi et al. .............. 463/47 |
| 5,963,196 A * | 10/1999 | Nishiumi et al. ............ 345/161 |
| 5,989,123 A | 11/1999 | Tosaki et al. |
| 6,001,014 A | 12/1999 | Ogata et al. |
| 6,001,015 A | 12/1999 | Nishiumi et al. |
| 6,010,406 A | 1/2000 | Kajikawa et al. |
| 6,171,191 B1 | 1/2001 | Ogata et al. |
| 6,231,444 B1 | 5/2001 | Goto et al. |
| 6,394,906 B1 | 5/2002 | Ogata |
| 6,641,479 B1 | 11/2003 | Ogata et al. |

FOREIGN PATENT DOCUMENTS

| | | |
|---|---|---|
| EP | 0 695 566 A1 | 2/1996 |
| JP | 62-194389 U | 12/1987 |
| JP | 03-021691 U | 3/1991 |
| JP | 6-85821 | 11/1994 |
| JP | 7-24147 | 1/1995 |
| JP | 7-88252 A | 4/1995 |
| JP | 07-112074 A | 5/1995 |
| JP | 07-194846 A | 8/1995 |
| JP | 8-24439 | 1/1996 |
| JP | 8-45392 | 2/1996 |
| JP | 08-140301 A | 5/1996 |
| JP | 09-000741 A | 1/1997 |
| JP | 9-167050 | 6/1997 |
| WO | WO-92/16921 A1 | 10/1992 |

* cited by examiner

OPERATING DEVICE FOR GAME MACHINE

CROSS-REFERENCE TO RELATED APPLICATIONS

This is a continuation of application Ser. No. 10/687,372 filed Oct. 16, 2003, which is a continuation of application Ser. No. 09/818,363 filed Mar. 27, 2001, now U.S. Pat. No. 6,682,426, which is a continuation of application Ser. No. 09/091,121 filed Sep. 24, 1998, now U.S. Pat. No. 6,231,444, the disclosures of which are hereby incorporated by reference herein.

BACKGROUND OF THE INVENTION

This invention relates to an operating device used in a game machine employing a display device for, for example, a television receiver. More particularly, it relates to an operating device controlling the operation of rotating a display character displayed on a display screen, continuously changing its speed of movement or deforming the display character.

Heretofore, a game machine employing a television receiver has a main body portion connected to the television receiver used as a display device, and an operating device connected to this main body portion of the game machine over a connection cable for controlling the display character displayed on the display screen of the television receiver.

The main body portion of the game machine has enclosed therein a disc driving unit for reproducing an optical disc as a recording medium carrying a recorded game program and a picture processing device for displaying the display character along with a background scene on the screen of the television receiver in accordance with the game program recorded on the optical disc.

Plural operating buttons are arranged in the operating device connected to the main body portion of the game machine. The user operates these operating buttons provided on the operating device for entering to the picture processing device the command information concerning the movement of the display character displayed on the display screen of the television receiver for controlling the direction of movement of the display character in accordance with the command information for carrying out the game.

The operating device used in this sort of the game machine is used by being gripped with hand or finger. That is, such operating device is used which has, on its one side, a direction command operating unit including a cross-shaped or circular direction command operating button and which also has, on its other side, a function setting unit including plural function setting/executing buttons for setting or executing the operating functions of the display characters. The direction command operator includes four switches arranged at right angles to one another and having operating units adapted for being contacted with or moved away from associated contacts. These switches are selectively turned on and off by the cross-shaped or circular direction command operating buttons for moving the display characters. For example, the display character is moved in a direction along which is arrayed the one of the four switches that has been turned on. The function setting/executing unit has switches arranged in association with the plural function setting/executing buttons. By turning on the switch associated with the function setting/executing button, the function of the display character allocated to the button is set or the function proper to the display character is executed.

Since the direction command operating unit of the operating device simply affords a command signal for moving the display character in a direction along which is arrayed the one of the four switches arranged at right angle to each other, the operating unit cannot issue the command information of rotating the display character as it is advanced, or of changing the line of sight of the display character. The result is that difficulties are encountered in constructing the game program employing a display character performing variegated movements.

On the other hand, since the switches making up the direction command operating unit merely issue the command information of controlling the movement of the display character by being turned on and off by actuation of the direction command operating buttons, the display character performs intermittent movements, while being unable to perform a series of continuous movements.

Thus, such an operating device has been proposed having an operating unit to which can be entered a command signal enabling the display character to be moved as it rotates or as it changes its speed or enabling the display character to change its form or configuration.

An operating device of this type has been disclosed in Japanese Laid-Open Patent Application 7-88252.

However, if a large number of operating units are provided in the operating device, it becomes difficult to smoothly select the operating units.

SUMMARY OF THE INVENTION

An operating device for a game machine in accordance with one embodiment of the present invention includes a main body; and first and second grips protruding at spaced positions from the main body. The first and second grips and the main body collectively generally define a U-shape in a plane when viewed in a direction normal to the plane. The U-shape defines an empty space between the first and second grips when viewed in the direction normal to the plane. A first operating unit is mounted to the main body adjacent one of the spaced positions, the first operating unit having an input element operable to generate a signal; a second operating unit is mounted to the main body adjacent another one of the spaced positions, the second operating unit having an input element operable to generate a signal; and third and fourth operating units are mounted to the main body so as to protrude into the empty space, each of the third and fourth operating units having an input element operable to generate a signal. When the first and second grips are gripped, the third and fourth operating units can be manipulated by the thumb of the hand gripping the first or second grips, respectively.

An operating device for a game machine in accordance with another embodiment of the present invention includes a main body; and first and second grips protruding at spaced positions from the main body. A first operating unit is mounted to the main body adjacent one of the spaced positions, the first operating unit having an input element operable to generate a signal; and a second operating unit is mounted to the main body adjacent another one of the spaced positions, the second operating unit having an input element operable to generate a signal. Third and fourth operating units are mounted to the main body, the third operating unit being positioned adjacent the first operating unit and having an input element operable to generate a signal, and the fourth operating unit being positioned adjacent the second operating unit and having an input element operable to generate a signal. A vibration-imparting unit is arranged in at least one of the first and second grips.

An operating device for a game machine in accordance with yet another embodiment of the present invention includes a main body; and first and second grips protruding at spaced positions from the main body. A first operating unit is mounted to the main body adjacent one of the spaced positions, the first operating unit having an input element operable to generate a signal; a second operating unit is mounted to the main body adjacent another one of the spaced positions, the second operating unit having an input element operable to generate a signal; and third and fourth operating units are mounted to the main body so as to be positioned between the first and second grips, each of the third and fourth operating units having an input element operable to generate a signal. A vibration-imparting unit is arranged in at least one of the first and second grips.

An operating device for a game machine in accordance with still a further embodiment of the present invention includes a main body; and first and second grips protruding at spaced positions from the main body. A first operating unit is mounted to the main body adjacent one of the spaced positions, the first operating unit having an input element operable to generate a signal; and a second operating unit is mounted to the main body adjacent another one of the spaced positions, the second operating unit having an input element operable to generate a signal. Third and fourth operating units are also mounted to the main body, the third operating unit being positioned adjacent the one of the spaced positions and having an input element operable to generate a signal, and the fourth operating unit being positioned adjacent the another one of the spaced positions and having an input element operable to generate a signal. A vibration-imparting unit is arranged in at least one of the first and second grips.

An operating device for a game machine in accordance with yet a further embodiment of the present invention includes a main body having front and rear sides; and first and second grips protruding at spaced positions from the rear side of the main body. A first operating unit is mounted to the main body adjacent one of the spaced positions, the first operating unit having an input element operable to generate a signal; a second operating unit is mounted to the main body adjacent another one of the spaced positions, the second operating unit having an input element operable to generate a signal; and third and fourth operating units are mounted to the main body, each of the third and fourth operating units having an input element operable to generate a signal, the third and fourth operating units projecting from the main body between the first and second grips. A vibration-imparting unit is arranged in at least one of the first and second grips.

An operating device for a game machine in accordance with still another embodiment of the present invention includes a main body; and first and second grips protruding at spaced positions from the main body. A first operating unit is mounted to the main body adjacent one of the spaced positions, the first operating unit having an input element operable to generate a signal; a second operating unit is mounted to the main body adjacent another one of the spaced positions, the second operating unit having an input element operable to generate a signal; a third operating unit projects from the first operating unit to a position between the first and second grips, the third operating unit having an input element operable to generate a signal; and a fourth operating unit projects from the second operating unit to a position between the first and second grips, the fourth operating unit having an input element operable to generate a signal. A vibration-imparting unit is arranged at least one of the first and second grips.

An operating device for a game machine in accordance with a still further embodiment of the present invention includes a main body; and first and second grips protruding at spaced positions from the main body. A first operating unit is mounted to the main body adjacent one of the spaced positions, the first operating unit having an input element operable to generate a signal; and a second operating unit is mounted to the main body adjacent another one of the spaced positions, the second operating unit having an input element operable to generate a signal. Third and fourth operating units are also mounted to the main body, the third operating unit being positioned adjacent the first grip and having an input element operable to generate a signal, and the fourth operating unit being positioned adjacent the second grip and having an input element operable to generate a signal. A vibration-imparting unit is arranged at least one of the first and second grips.

Additional embodiments of the present invention provide a game machine, the game machine including a main unit for reading a game program; and an operating device interconnected with the main unit. The operating device may have the structure of any one of the operating devices whose embodiments are described above.

DETAILED DESCRIPTION OF THE PREFERRED EMBODIMENTS

Figure 1:
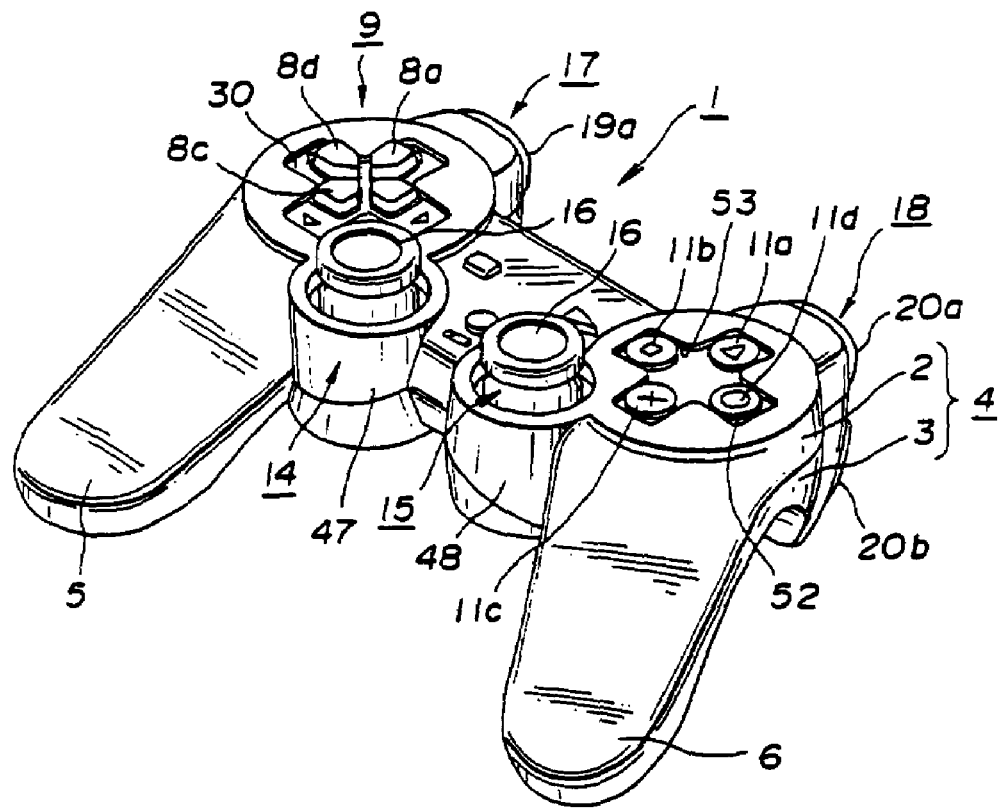
FIG. 1 is a perspective view showing an operating device for a game machine according to the present invention.

Referring to the drawings, an operating device for a game machine according to the present invention will be explained in detail.

The operating device for the game machine is connected to a main body portion of the game machine for controlling the operation of the present game machine for executing the game software recorded on an optical disc. The main body portion of the game machine has enclosed therein a disc driving unit for reproducing an optical disc as a recording medium having a game program recorded thereon and a picture processing unit for displaying a display character along with a background picture on the screen of a television receiver in accordance with a game program recorded on the optical disc.

Figure 2:
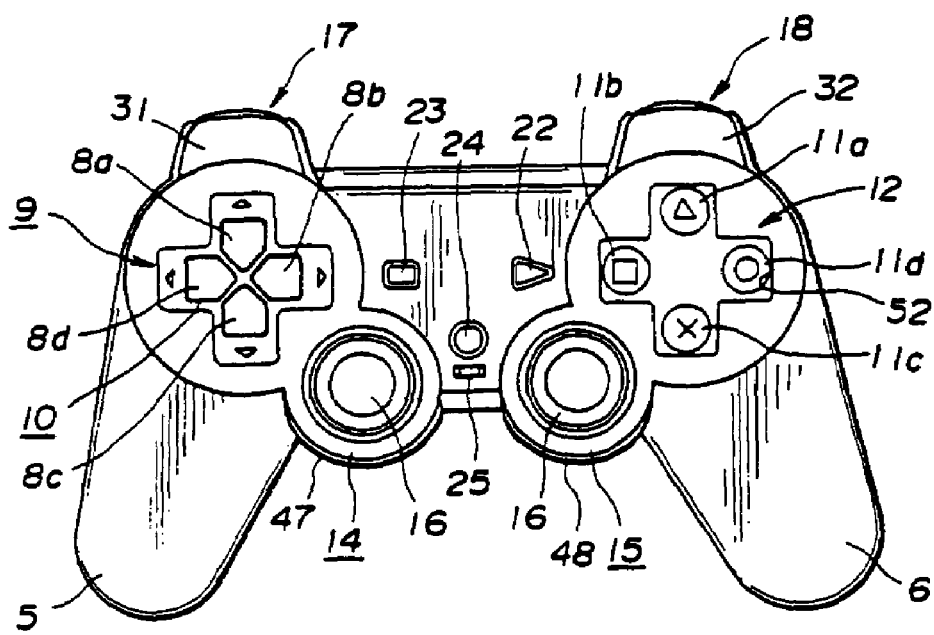
FIG. 2 is a plan view of the operating device for a game machine shown in FIG. 1.
Figure 3:
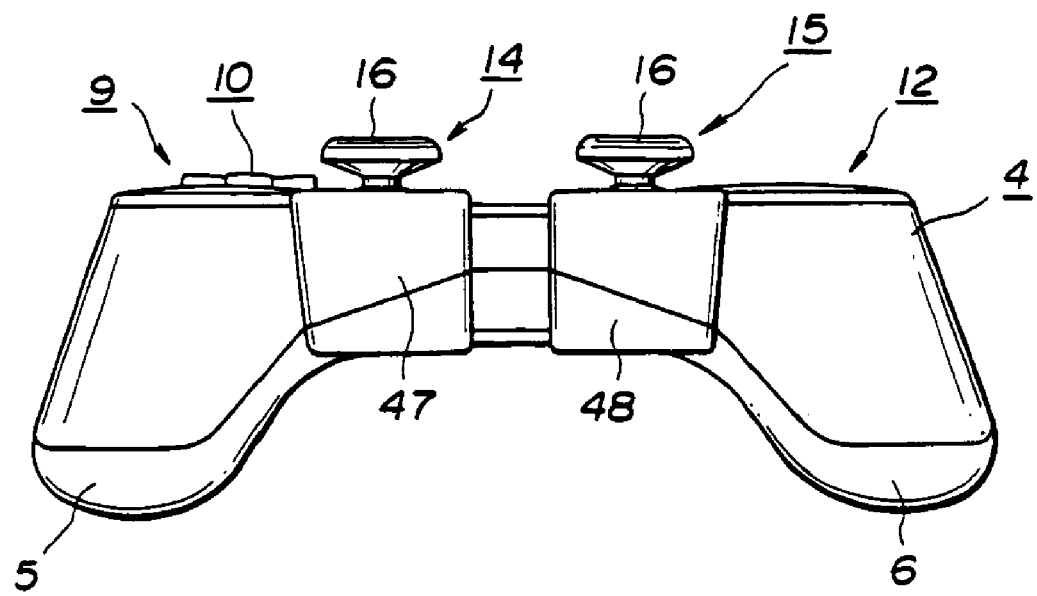
FIG. 3 is a back side view of the operating device for the game machine shown in FIG. 1.
Figure 4:
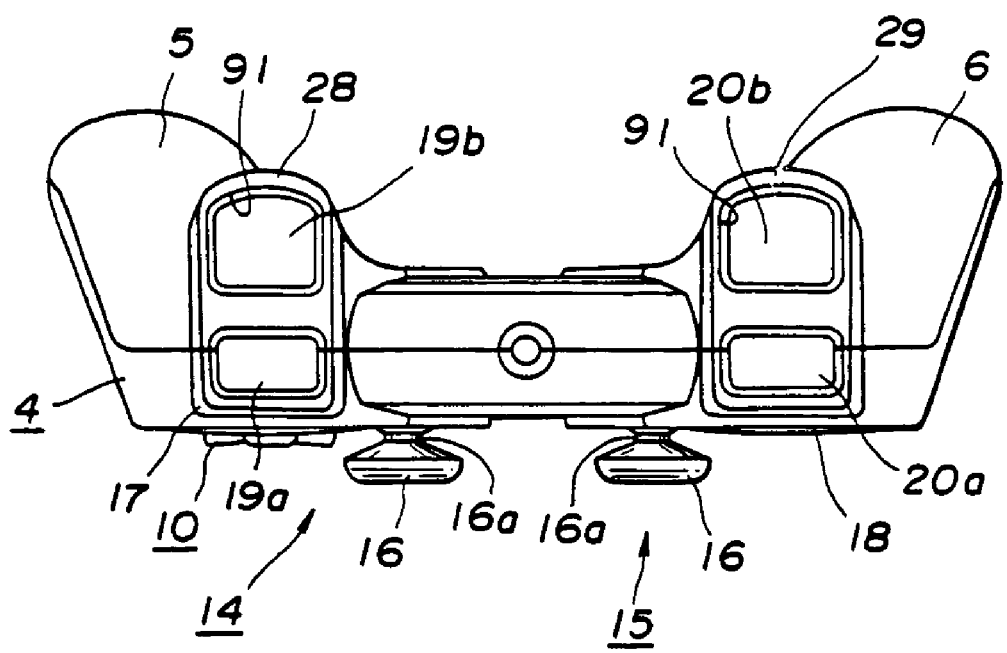
FIG. 4 is a front view of the operating device for the game machine shown in FIG. 1.
Figure 5:
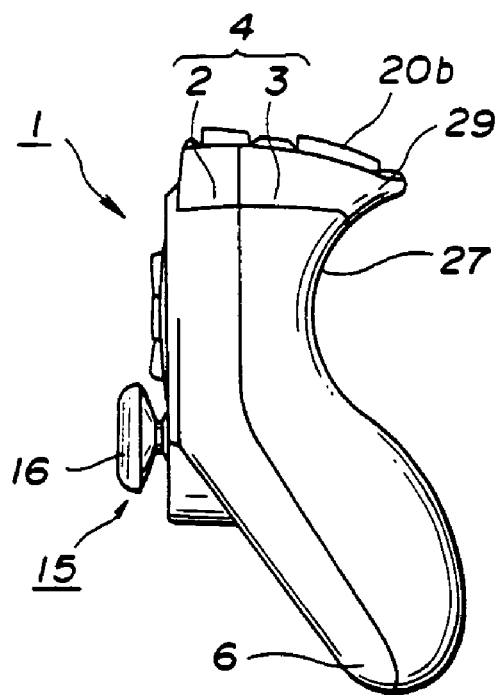
FIG. 5 is a right-hand side view of the operating device for the game machine shown in FIG. 1.
Figure 6:
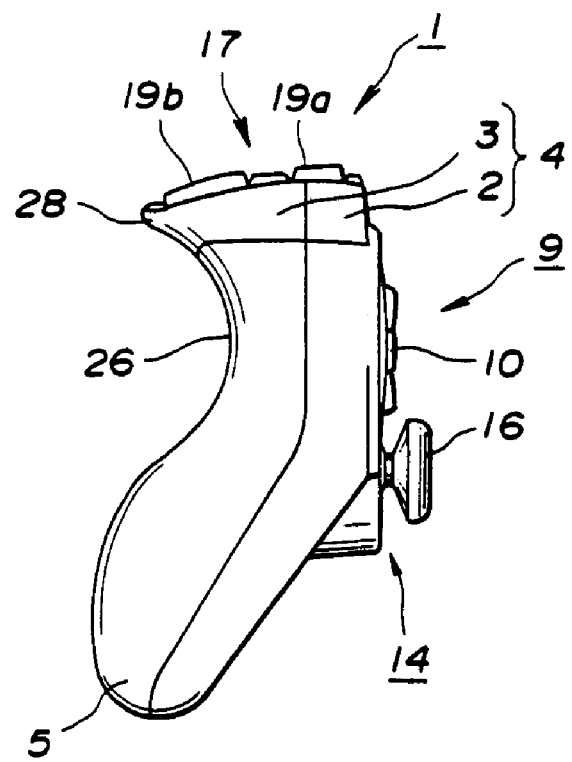
FIG. 6 is a left-hand side view of the operating device for the game machine shown in FIG. 1.

The operating device 1 for the game machine according to the present invention includes a main body portion 4 made up of an upper half 2 and a lower half 3 abutted and secured to each other such as with set-screws, as shown in FIG. 1. Referring to FIGS. 1 and 2, a first grip portion 5 and a second grip portion 6 are protuberantly formed on the lateral surface on both ends of the main body portion 4 so that, when the device 1 is connected to the main body portion of the game machine for playing the game, the grip portions 5, 6 will be gripped by being held in their entirety with the user's palms. These first and second grip portions are progressively spaced apart from each other towards their distal ends while being directed downwardly of the main body portion 4, as shown in FIGS. 2, 3 and 4. For enabling the gripping over an extended time, the first and second grip portions 5, 6 are tapered from their connection to the main body portion 4, while being arcuately shaped on the peripheral surfaces and on the distal ends thereof, as shown in FIGS. 2, 5 and 6.

On one end side of the main body portion 4 is mounted a first operating unit 9 having first to fourth thrusting operators 8a, 8b, 8c and 8d protruding from the upper surface of the main body portion 4 at right angles to each other, as shown in FIGS. 1 and 2. The first to fourth thrusting operators 8a, 8b, 8c and 8d making up the first operating unit 9 are unified to a rotation actuating member 10 having its center portion supported for rotation and are arrayed at right angles to one another about the center of rotation of the rotation actuating member 10. That is, the first to fourth thrusting operators 8a, 8b, 8c and 8d making up the first operating unit 9 are connected as one to one another. The first operator 9 is provided with switch devices, as signal input devices, in association with the first to fourth thrusting operators 8a, 8b, 8c and 8d. The first operator 9 operates as a direction command controller controlling the movement of the display character, such that, by selectively actuating the first to fourth thrusting operators 8a, 8b, 8c and 8d and by selectively turning on/off the switch devices associated with the thrusting operators, the display character is moved in the arraying direction of the thrust operator 8a, 8b, 8c or 8d.

On the opposite side of the main body portion 4 is mounted a second operating unit 12 having protuberant first to fourth thrusting operators 11a, 11b, 11c and 11d arrayed at right angles to one another. These first to fourth thrusting operators 11a, 11b, 11c and 11d are formed as independent members and switch devices as signal input devices are mounted in association with these thrusting operators 11a, 11b, 11c and 11d. By turning on the switch devices associated with the first to fourth thrusting operators 11a, 11b, 11c and 11d, the second operating unit 12 sets the functions of the display character allocated to the thrusting operators 11a, 11b, 11c and 11d or executes the functions of the display character, the second operating unit 12 thus operating as a function setting and/or executing section.

The operating device 1 of the present invention has third and fourth operating units 14, 15 on the proximal sides of the first and second grip portions 5, 6 where they connect to main body portion 4. Each of these third and fourth operating devices 14, 15 includes a rotation member 16 rotatable in a 360° direction about a pivot 16a as the center of rotation and a signal input element, such as a variable resistance element, operated by this rotation member 16. Specifically, the rotation member 16 is mounted towards the distal end of a pivot 16a mounted so as to be reset to its neutral position by a biasing member and is rotated in a 360° direction about the pivot 16a as center of rotation. These third and fourth operating units 14, 15 are used for enabling inputting of a command signal for enabling analog movements such as combined rotation and linear movement, linear movement with a variable speed or change of the configuration of the display character by rotational operation of the rotation member 16.

On the left and right ends towards the front side of the main body portion 4 opposite to its back side from which are protruded the first and second grip portions 5, 6 are arranged fifth and sixth operating units 17, 15. These fifth and sixth operating units 17, 18 include first and second thrusting operators 19a, 19b and 20a, 20b, respectively. These thrusting operators 19a, 19b and 20a, 20b are associated with switch devices. By turning on the switch associated with the first and second thrusting operators 19a, 19b and 20a, 20b, the fifth and sixth operating units 17, 18 set the function of the display character allocated to the thrusting operators 19a, 19b and 20a, 20b or execute the functions owned by the display character, the fifth and sixth operating units 17, 18 thus operating as function setting and/or executing sections.

Between the first operating unit 9 and the second operating unit 12 on the upper surface of the main body portion 4 are mounted, side-by-side, a start switch 22 for commanding start of a game and a selection switch 23 for selecting, at the time of starting the game, the degree of ease or difficulty with which the game is played. Between the third and fourth operating units 14, 15 on the upper surface of the main body portion 4 are mounted a mode selection switch 24 for selecting the operating mode of the third and fourth operating units 14, 15 and a display unit 25 for displaying the state of the operating mode of the third and fourth operating units 14, 15. This display unit 25 is constituted by a light emitting device, such as light emitting diode. By switching the mode selection switch 24, an operating mode enabling the inputting of a command signal from the third and fourth operating units 14, 15 or an operating mode inhibiting the inputting of the command signal from the third and fourth operating units 14, 15 is selected. In addition, an operating mode is selected which enables inputting of a command signal from the third and fourth operating units 14, 15 and which has switched the functions of the first to fourth thrusting operators 11*a* to 11*d* and the functions of the first and second thrusting operators 19*a*, 19*b*, 20*a*, 20*b* of the fifth and sixth operating units 17, 18. Depending on the states of the operating modes, the display unit 25 is turned on and off, with switching of the display light.

Figure 7:
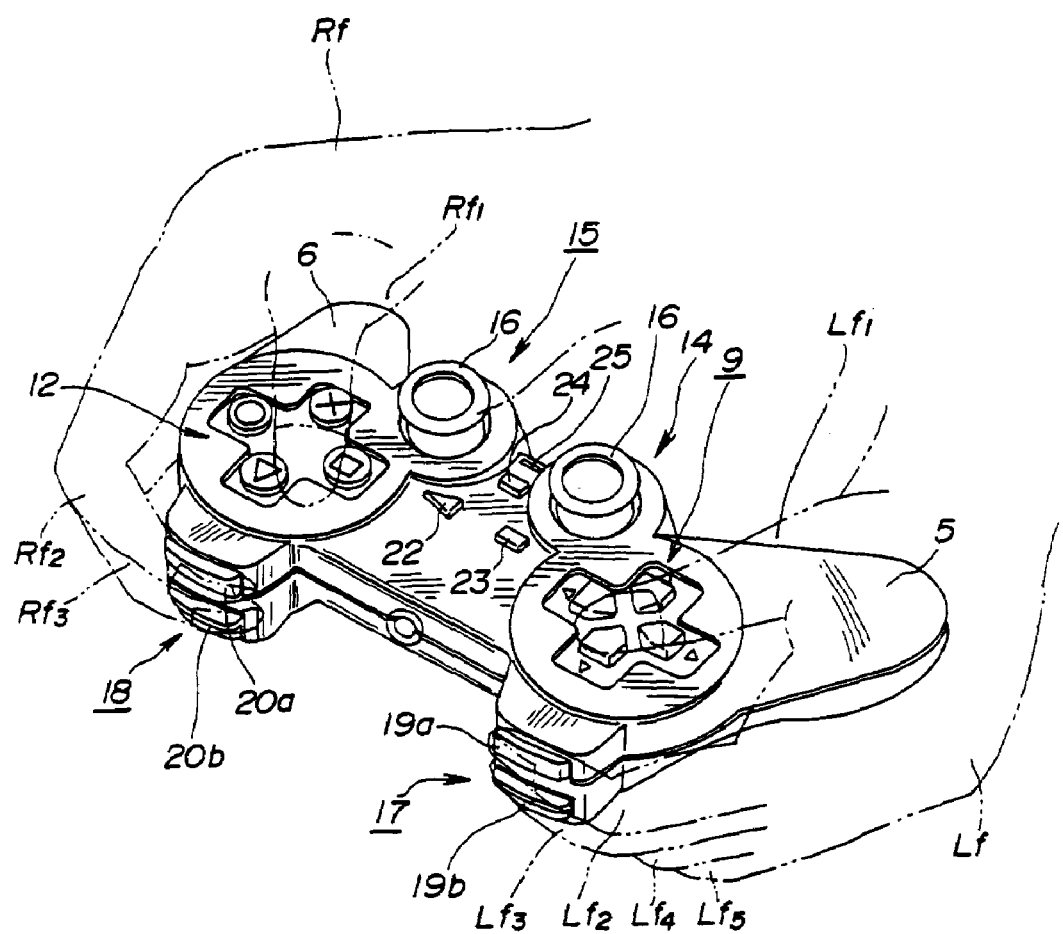
FIG. 7 is a perspective view showing the state of use of the operating device for the game machine shown in FIG. 1.

In the lower surface of the main body portion 4 are formed engagement recesses 26, 27 engaged by a portion of left and right fingers Lf, Rf when the first and/or second grip portions 5, 6 are gripped by these fingers, as shown in FIG. 7. These engagement recesses 26, 27 are formed as smoothly curved reentrant portions, as shown in FIGS. 5 and 6.

In register with the engagement recesses 26, 27 on the front side of the main body portion 4 are formed depending finger supports 28, 29, as also shown in FIGS. 5 and 6. Specifically, the finger supports 28, 29 are protruded from the lower ends of protuberant portions 31, 32 on both ends on the front side of the main body portion 4 carrying the fifth and sixth operating units 17, 15.

With the above-described operating device of the present invention, in which the first and second grip portions 5, 6 are protuberantly formed on the main body portion 4, since the first and second grip portions 5, 6 are held by being entirely wrapped with both palms, there is no necessity of supporting the main body portion 4 with fingers, such that the operating device can be gripped in such a state that ten fingers at the maximum and six fingers in the least of both hands can be moved freely. If, for example, the first and second grip portions 5, 6 are gripped as they are wrapped entirely with both palms, both thumb fingers Lf1, Rf1 of left and right hands can be extended over rotation members 16 of the third and fourth operating units 14, 15, and over the first to fourth thrusting operators 8*a* to 8*d* of the first operating unit 9 and the first to fourth thrusting operators 11*a* to 11*d* of the second operating unit 12 to enable selective thrusting of the rotation member 16, thrusting operators 8*a* to 8*d* and thrusting operators 11*a* to 11*d*. In particular, since the rotation members 16 of the third and fourth operating units 14, 15 are arranged facing the proximal ends which are coupling sides to the main body portion 4 of the first and second grip portions 5, 6 gripped by being entirely enclosed by both palms, the rotation members 16 lie closest to the thumb fingers Rf1, Lf1 when the first and second grip portions 5, 6 are gripped by left and right hands. Thus, the rotation members 16 can be turned easily with the thumb fingers Rf1, Lf1.

Also, when the first and second grip portions 5, 6 are gripped by being entirely enclosed by both palms, as shown in FIG. 7, the index fingers Rf2, Lf2 and second fingers Rf3, Lf3 of both hands can be extended to positions enabling selective thrusting of the first and second thrusting operators 19*a*, 19*b* and 20*a*, 20*b* of the fifth and sixth operating units 17, 18.

Thus, when the operating device 1 is gripped by both hands, the first and second grip portions 5, 6 are enclosed with both palms and both third fingers Lf4, Rf4 and/or little fingers Lf5, Rf5 of left and right hands can be engaged in the engagement recesses 26, 27 and set on the finger supports 28, 29, so that the main body portion 4 can be gripped in position. Since the fingers can be set in position on the first to sixth grip portions 9, 12, 14, 15, 17 and 18, correct operations can be realized.

Figure 8:
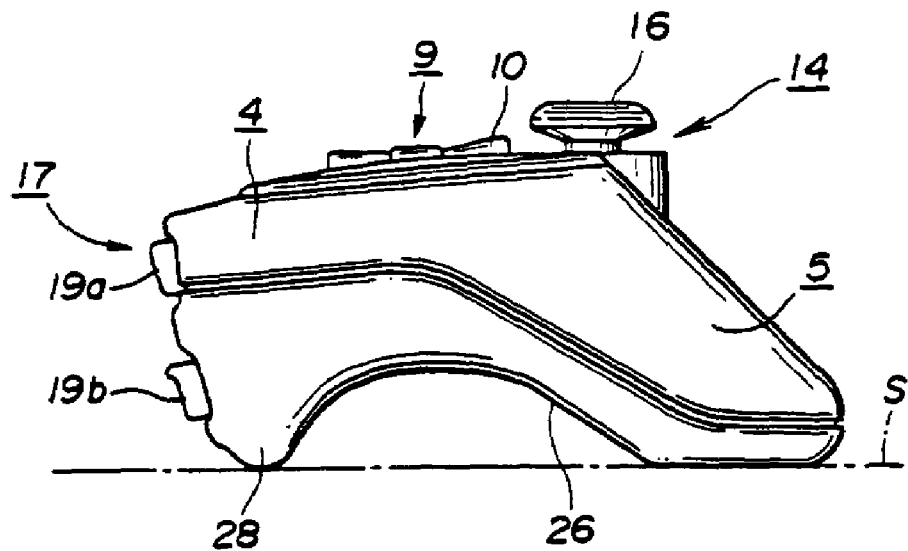
FIG. 8 is a side view showing the state of use of the operating device for the game machine shown in FIG. 1, with the operating device being mounted on a mounting surface.

Instead of being gripped by hand and fingers, the operating device 1 can also be set on a planar setting surface 5, such as a table, as shown in FIG. 8. The operating device 1 is designed so that, if the device 1 is set on the setting surface S with the distal ends of the first and second grip portions 5, 6 and the distal ends of the finger supports 28, 29 as supports, the operating surfaces of the first to fourth thrusting operators 8*a* to 8*d* of the first operating unit 9 and of the first to fourth operators 11*a* to 11*d* of the second operating unit 12 will be substantially parallel to the setting surface S. Thus the operating device 1 can be set on the planar setting surface S and, with the palms set on the first and second grip portions 5, 6, the first to sixth operators 9, 12, 14, 15, 17 and 18 can be manipulated with free fingers.

Figure 9:
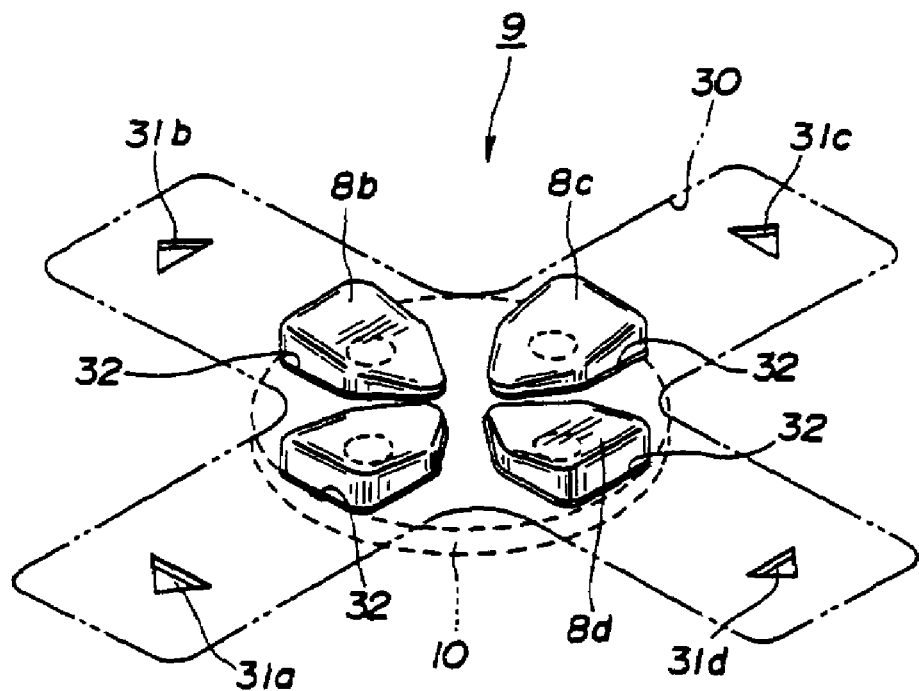
FIG. 9 is a perspective view showing essential portions of the first operating unit.
Figure 10:
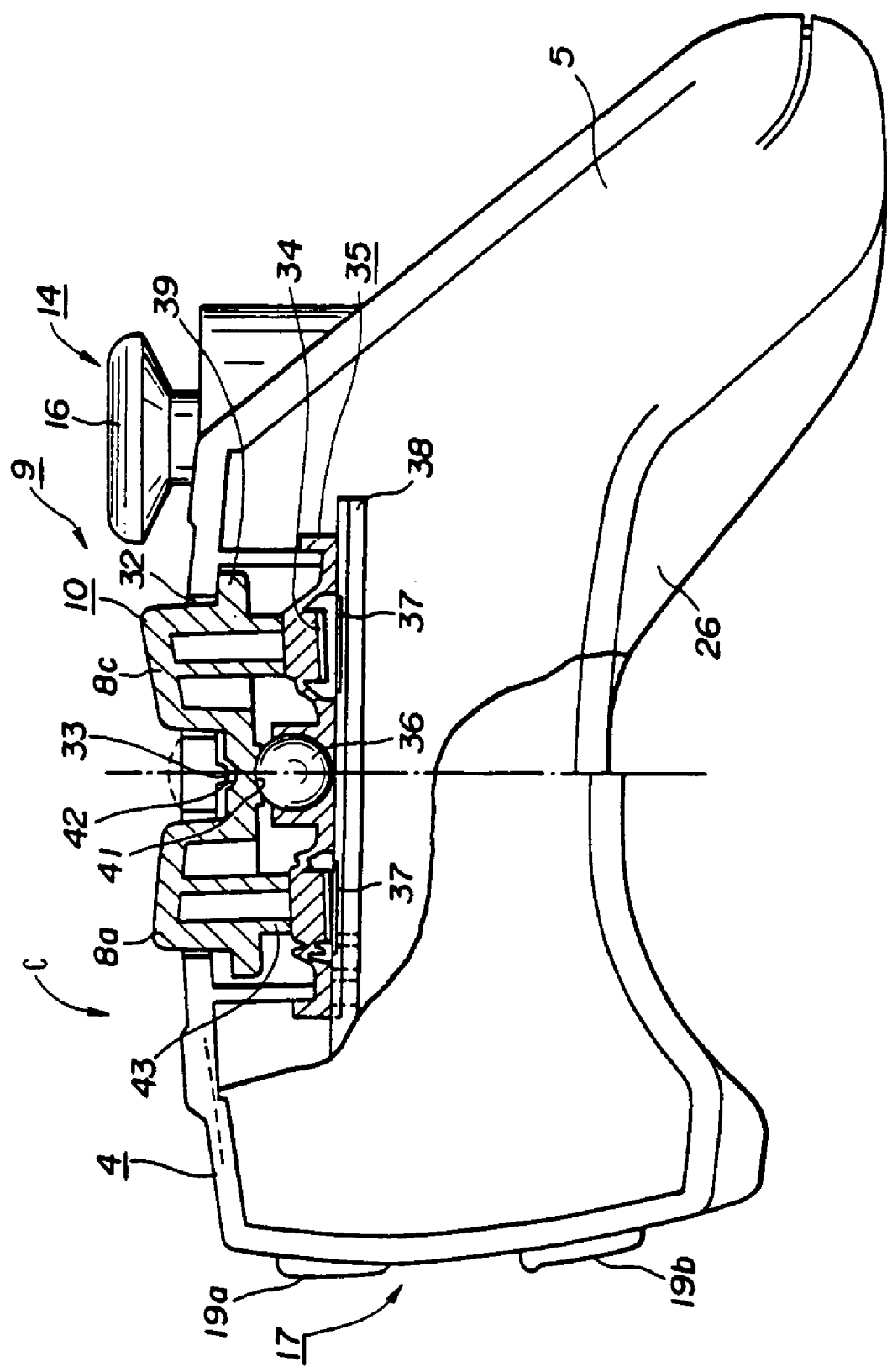
FIG. 10 is a partial cross-sectional view showing the first operating unit.

The first operating unit 9 of the operating device 1 is explained in further detail. Referring to FIGS. 1, 9 and 10, the first operating unit 9 is designed so that the first to fourth thrusting operators 8*a* to 8*d* formed on a rotation actuating member 10 protrude into a substantially cross-shaped recess 30 towards one end of the upper surface of the main body portion 4. On upper, lower, left and right ends of the cross-shaped recess 30 are formed bearing indicators 31*a*, 31*b*, 31*c* and 31*d* on the inner sides of which are formed four apertures 32 at right angles to one another for allowing the first to fourth thrusting operators 8*a* to 8*d* to protrude towards the upper side of the main body portion 4. At a mid portion surrounded by these apertures 32 is formed a center support boss 33 for supporting the center of the upper surface of the rotation actuating member 10. This center support boss 33 is formed as one with the inner upper surface of the main body portion 4. Facing the rotation actuating member 10 is mounted an elastic member 35 having four movable contacts 34 actuated by the first to fourth thrusting operators 8*a* to 8*d*. At the center of the elastic member 35 is held a spherically-shaped fulcrum element 36, such as a stainless steel ball, for supporting the center of the bottom surface of the rotation actuating member 10. Facing the elastic member 35 is arranged a circuit board 38 having four fixed contacts 37 associated with movable contacts 34.

Referring to FIGS. 9 and 10, the rotation actuating member 10 constituting the first operating unit 9 includes a circular-shaped base portion 39, first to fourth thrusting operators 8*a* to 8*d* formed as one on an upper portion of the base portion 39, a spherically-shaped first recess 41, a spherically-shaped second recess 42 and a contact guide 43. The first recess 41 is formed on the bottom surface of the center portion of the base portion 39 for engaging with the spherical surface of the fulcrum element 36, while the second recess 42 is formed on the upper surface of the center portion of the base portion 39 for engaging with the center support boss 33. The contact guide 43 is protuberantly formed on the lower surface of the base portion 39 for thrusting the back side of the movable contacts 34 of the elastic member 35. Referring to FIG. 9, the four thrusting operators 8*a* to 8*d*, formed as one with the rotation actuating member 10, are formed on the upper surface of the base portion 39 so as to have facing ends tapered and so as to be thicker from the center towards the outer sides, and protrude from the upper surface side of the main body portion 4 via the respective apertures 32.

The elastic member 35 is sandwiched between the circuit board 38 and the rotation actuating member 10 and includes four movable rubber contacts 34 in association with the first to fourth thrusting operators 8a to 8d.

The fulcrum element 36 is spherically-shaped and is arranged at a central portion of the rotation actuating member 10 in register with the center support boss 33 so as to be engaged in the first recess 41 formed at the center of the rotation actuating member 10.

When the rotation actuating member 10 is arranged in the main body portion 4, the first to fourth thrusting operators 8a to 8d are arranged radially with the center support boss 33 as a center and are gradually increased in height from the facing ends towards the opposite outer ends. Thus, when the fingertip is set on the center portion of the recess 30 surrounded by the first to fourth thrusting operators 8a to 8d, the relative position of the latter can be easily discerned by the tactile feel at the fingertip and by the step difference between the center portion and the first to fourth thrusting operators 8a to 8d. Moreover, if the fingertip is shifted during the switch operation from the center portion towards the outer side of the recess 30, it can be easily discerned by the tactile feel at the fingertip which of the first to fourth thrusting operators 8a to 8d is being thrust.

In the above-described structure of the first operating unit 9, if none of the first to fourth thrusting operators 8a to 8d is thrust, the rotation actuating member 10 is raised via the contact guide 43, under the bias of the elastic member 35, with the center support boss 33 becoming engaged in the spherically-shaped second recess 42 of the rotation actuating member 10. Simultaneously, the peripheral portion of the circular-shaped base portion 39 is retained by the ends of the apertures 32, so that the rotation actuating member 10 is retained in an initial position in which the first to fourth thrusting operators 8a to 8d protrude beyond the upper surface of the main body portion 4.

Figure 12:
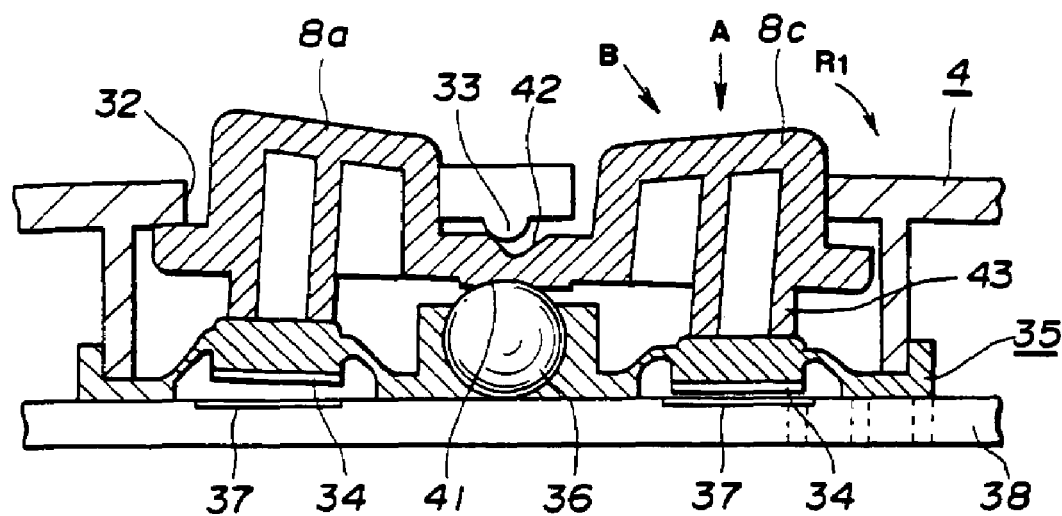
FIG. 12 is a cross-sectional view showing the state of the second thrusting operator of the first operating unit being thrust.
Figure 13:
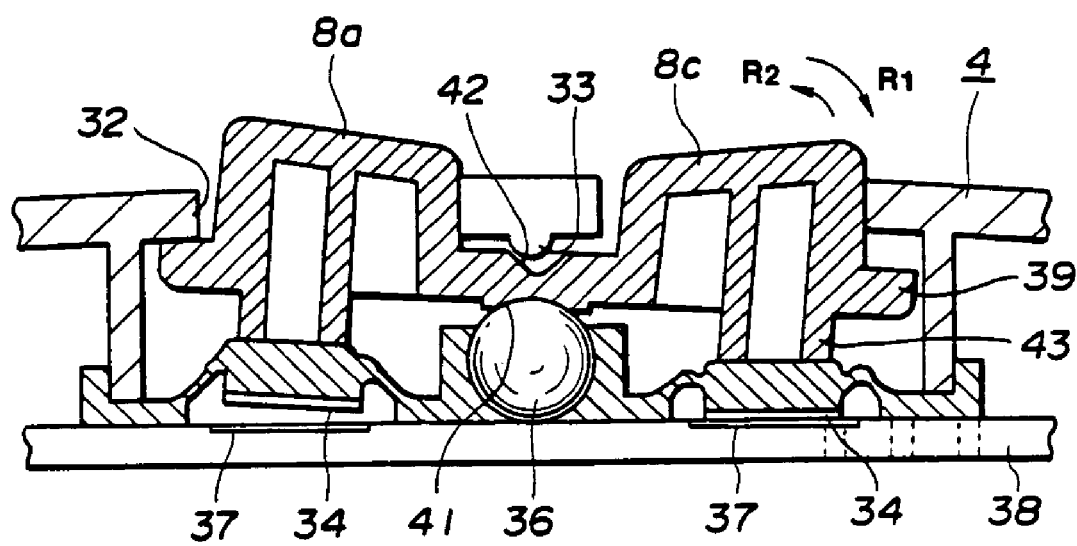
FIG. 13 is a cross-sectional view showing the state of the second thrusting operator of the first operating unit having been thrust.

If, with the first to fourth thrusting operators 8a to 8d in the initial position, the third thrusting operator 8c is thrust in the direction of arrows A or B in FIG. 12, the rotation actuating member 10 is rotated in a direction indicated by arrow R1 or towards the right in FIG. 12, as the first recess 41 is rotated on the spherical surface of the fulcrum element 36, with the elastic member 35 being thrust downwards by the third thrusting operator 8c. If the third thrusting operator 8c is thrust further, the rotation actuating member 10 is further rotated in the direction of arrow R1, with the fulcrum element 36 as the center of rotation, as shown in FIG. 13, for establishing electrical connection by the movable contact 34 being contacted with the underlying fixed contact 37.

Figure 11:
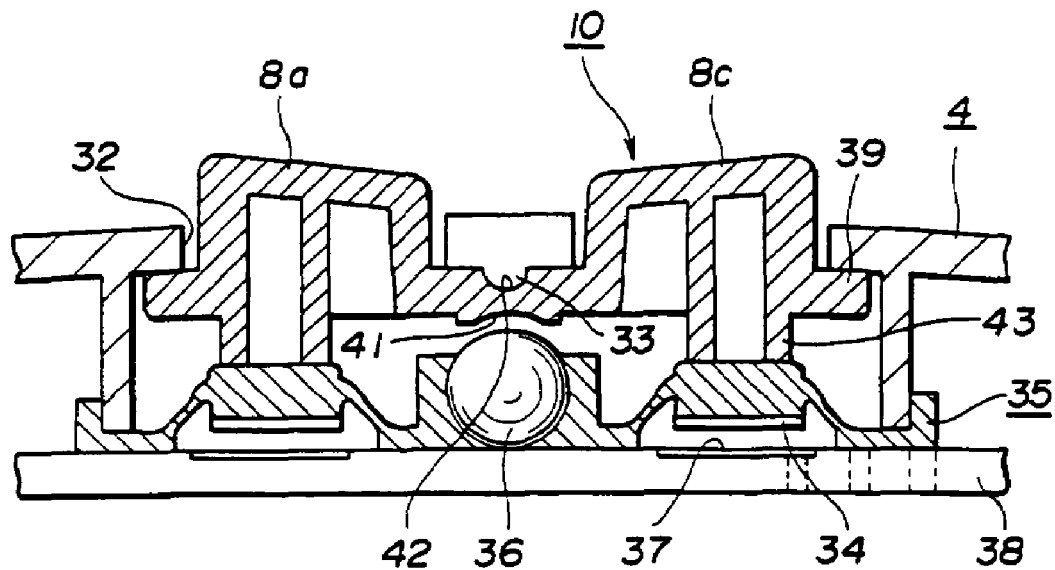
FIG. 11 is a cross-sectional view showing the inoperative state of first to fourth thrusting operators making up the first operating unit.

If the thrusting on the third thrusting operator 8c is released, the first recess 41 is moved in a direction away from the fulcrum element 36, with which it has so far been in contact, under the bias of the elastic member 35. That is, the third thrusting operator 8c is rotated in the direction of arrow R2 in FIG. 13 for spacing the movable contact 34 away from the fixed contact 37. If the third thrusting operator 8c is rotated further in the direction indicated by arrow R2 in FIG. 13, until the center support boss 33 is engaged with the second recess 42, the rotation actuating member 10 is reset to the initial position shown in FIG. 11.

On the other hand, if the first thrusting operator 8a is thrust towards the front side of the main body portion 4 as indicated by arrow C in FIG. 10, the elastic member 35 is deformed under its own elasticity so that, as the first recess 41 is rotated on the spherical surface of the fulcrum element 36, the first thrusting operator 8a is moved in a direction indicated by arrow C in FIG. 10 for realizing a switching operation by the movable contact 34 contacting the underlying fixed contact 37.

The movable contact 34 and the underlying fixed contact 37 make up a switch device and the switch on/off operation takes place by the movable contact 34 being contacted with or displaced away from the underlying fixed contact 37 to permit inputting of a command signal for, for example, moving the display character.

In the operation of the first to fourth thrusting operators 8a to 8d of the first operating unit 9, since the fulcrum point is formed by relative engagement of the spherically-shaped fulcrum element 36 and the spherically-shaped first recess 41, the contact between the spherically-shaped surfaces is exploited for varying the stroke of the rotation actuating member 10 for realizing the switching operation. Moreover, the thrusting operators 8a to 8d are arranged in a segmented manner on the main body portion 4, the direction of thrusting the first to fourth thrusting operators 8a to 8d is not limited in a fixed direction but the smooth switching operation may be realized by actuation from any arbitrary direction to prevent vibrations of the rotation actuating member 10 or shifting or distortion of the center position for improving operating characteristics.

The second operating unit 12 of the operating device 1 will be explained in further detail. Referring to FIGS. 1 and 2, the second operating unit 12 has a substantially cross-shaped recess 53 on the opposite side end on the upper surface of the main body portion 4 and apertures 52 are formed at upper, lower, left and right ends of the recess 53. The first to fourth thrusting operators 11a to 11d making up the second operating unit 12 are arranged on the main body portion 4 so that the distal ends thereof protrude from the upper surface of the main body portion 4. Within the inside of the main body portion 4 are arranged switch devices actuated by the first to fourth thrusting operators 11a to 11d. These switch devices are turned on or off by thrusting the first to fourth thrusting operators 11a to 11d for entering a command signal for setting the functions or executing the operations of the display character.

On the distal end faces of the first to fourth thrusting operators 11a to 11d are inscribed symbols indicating the functions of the thrusting operators 11a to 11d, such as □, ×, 0 or Δ. In the present embodiment, the first thrusting operator 8a, second thrusting operator 11b, third thrusting operator 11c and the fourth thrusting operator 11d are affixed with the symbols Δ, □, × and 0, respectively. Specifically, the third thrusting operator 11c and the fourth thrusting operator 11d, disposed towards the second grip portion 6 for facilitating the manipulation by the thumb finger, are reserved for entering command signals, such as "YES" or "NO", frequently used in playing the game. The third thrusting operator 11c and the fourth thrusting operator 11d therefore are affixed with marks 0 and × corresponding to the commands of "YES" and "NO", respectively.

Thus, in the operating device 1 designed to have a large number of operating units, the third and fourth thrusting operators 11c and 11d are placed at such positions as to permit facilitated manipulation to improve operability of the smallest number of thrusting operators required in playing the game.

The first to fourth thrusting operators 11a to 11d may be designed to display the respective functions by colors. That is, these first to fourth thrusting operators 11a to 11d may be of different colors for displaying their functions.

The third and fourth operating units 14 and 15 will now be explained. Referring to FIG. 1, these third and fourth operating units 14 and 15 are arranged on substantially cylindrically-shaped mounting portions 47, 48 at corner portions of the connection of the proximal ends of the first and second grip portions 5, 6 to the main body portion 4.

Since the third and fourth operating units 14 and 15 are of the same structure, the third operating unit 14 only is explained.

Figure 14:
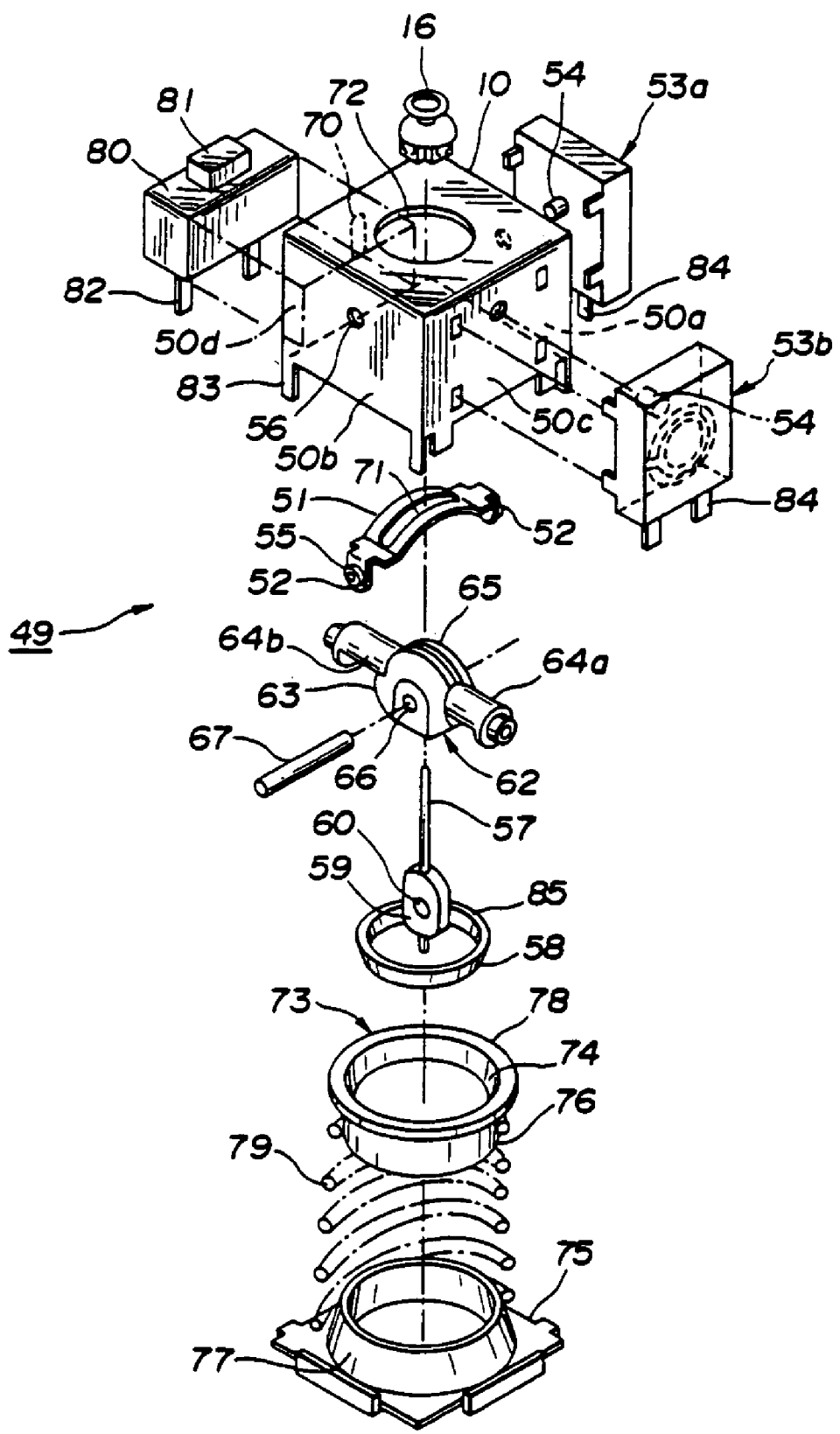
FIG. 14 is an exploded perspective view showing a multi-directional input device making up third and fourth operating units.

The third operating unit 14 has a multi-directional input device as shown in FIG. 14. This multi-directional input device has a box-shaped upper frame 50 and an arched first interlock member 51, as shown in FIG. 14. This interlock member 51 has its warped end 52 engaged by a rotational shaft 54 of a first variable resistor 53a constituting a rotary detector secured to a lateral side 50a of the upper frame 50. The interlock member 51 has on its opposite warped end 52 a boss 55 loosely fitted in an opening 56 formed in a lateral side 50b facing the lateral side 50a of the frame 50 for rotatably supporting the first interlock member 51 on the upper frame 50.

An operating shaft 57 is mounted at the center of the upper frame 50. This operating shaft 57 has a saucer-shaped operating member 58 and a disk 59 at its mid portion. This disk 59 has an orifice 60 and a rotation member 16 is mounted on the upper end of the operating shaft 57.

Within the upper frame 50 is arranged a second interlock member 62 extending at right angles to the operating shaft 57. The second interlock member 62 has a center ball 63 from which are transversely extended a pair of arms 64a, 64b. An elongated slot 65 extends from the upper surface to the lower surface of the ball 63. The operating shaft 57 and the disk 59 are inserted into the elongated slot 65. After registration of the orifice 60 in the disk 59 relative to a lateral side opening 66 in the ball 63, a pin 67 is inserted into the opening 66 and the orifice 60. The operating shaft 57 is thus mounted on the second interlock member 62 for rotation in the elongated slot 65 with the pin 67 as the center of rotation.

The end of the arm 64a of the second interlock member 62 is engaged with the rotary shaft 54 of the second variable resistor 53b secured to a lateral side 50c of the upper frame 50, while the end of the opposite side arm 64b is fitted in an elongated opening 70 formed in the lateral side 50d of the upper frame 50 so as to protrude outwardly from the lateral side 50d of the upper frame 50. The operating shaft 57 is passed through the elongated slot 71 in the first interlock member 51 so as to protrude outwardly via an opening 72 in the upper surface of the upper frame 50.

The operating shaft 57 is supported on a restoration member 73 having on its upper surface a recess 74 in which is rotatably housed the saucer-shaped operating member 58.

On the lower end side of the upper frame 50 is mounted a lower frame 75. The upper surface of the lower frame 75 is formed with a supporting wall section 77 for vertically movably housing a flange 76 of the restoration member 73. Between the bottom surface of the lower frame 75 and an outer peripheral edge 78 of the restoration member 73 is housed a spirally extending return spring 79. The restoration member 73 is biased upwards by this return spring 79. The end of the opposite side arm 64b of the second interlock member 62 is pressed against the upper edge of the elongated opening 70 on the lateral surface 50d of the upper frame 50. The second interlock member 62 is rotatably mounted on the upper frame 50 in a direction perpendicular to the first interlock member 51 below the first interlock member 51.

On the lateral side 50d of the upper frame 50 is mounted a thrust type switch device 80 which has its state changed over by pressing a spring-biased thrusting operator 81 against the spring bias. The switch device 80 has a thrusting operator facing an end 82 of arm 64b of the second interlock member 62. This end 82 protrudes in the same direction as a mounting leg 83 mounted on the lower edge of the upper frame 50 and terminals 84 of first and second variable resistors 53a, 53b.

The operating states of the multi-directional inputting device are as follows:

If the user grips the rotation member 16 for rotating the operating shaft 57 in an arbitrary direction, the operating shaft 57 is rotated about the point of intersection of the second interlock member 62 and the pin 67 as the center of rotation. With rotation of the operating shaft 57, the first interlock member 51 and the second interlock member 62 are rotated and further the rotational shafts 54 of the first and second variable resistors 53a, 53b are rotated for adjusting the resistance values.

Figure 15:
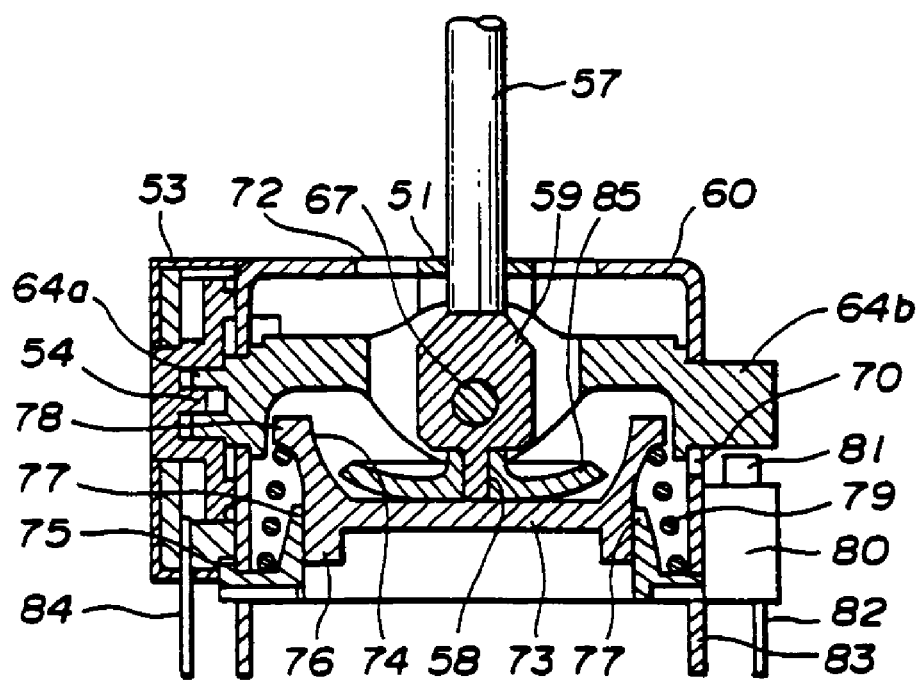
FIG. 15 is a cross-sectional view showing the multi-directional input device with an operating shaft in its initial state.
Figure 16:
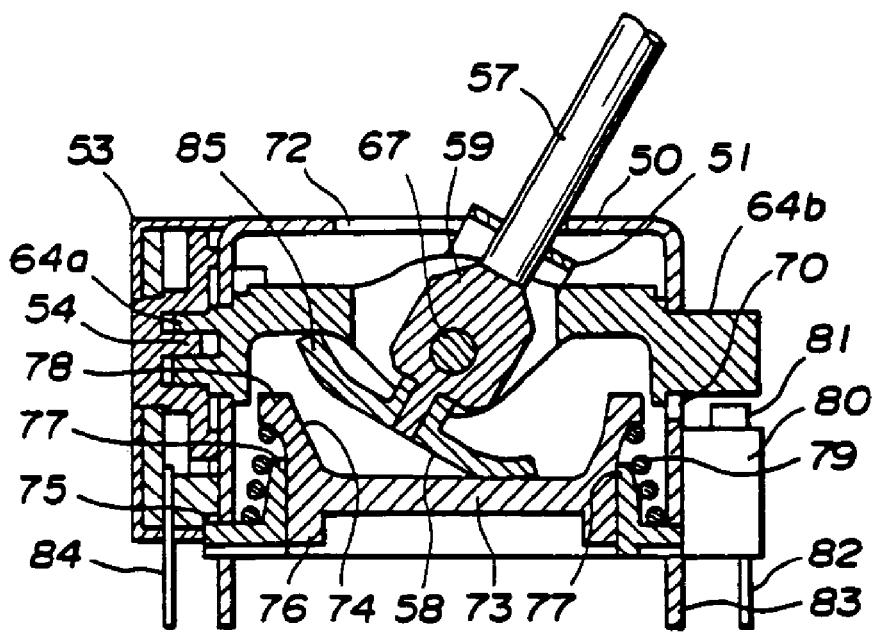
FIG. 16 is a cross-sectional view showing the multi-directional input device with the operating shaft having been rotated.

The automatic restoration operation of the operating shaft 57 is as follows:

In a neutral state in which the operating shaft 57 is not in operation, the operating shaft 57 is upstanding through opening 72 in the upper surface of the upper frame 50. The bottom surface of the operating member 58 compresses against the inner bottom surface of the restoration member 73 by the return spring 79. If the operating shaft 57 is tilted from this state in the clockwise direction, as shown in FIG. 16, the flange 85, having an arcuate portion with a progressively increasing radius of curvature towards an outer side of the operating member 58, thrusts the restoration member 73 so that the restoration member 73 is moved downwards along the supporting wall section 77 of the lower frame 75 against the force of the return spring 79. If the operating force on the operating shaft 57 is released, the operating shaft 57 is reset to the neutral state shown in FIG. 15, that is to an upstanding position, under the bias of the return spring 79.

Figure 17:
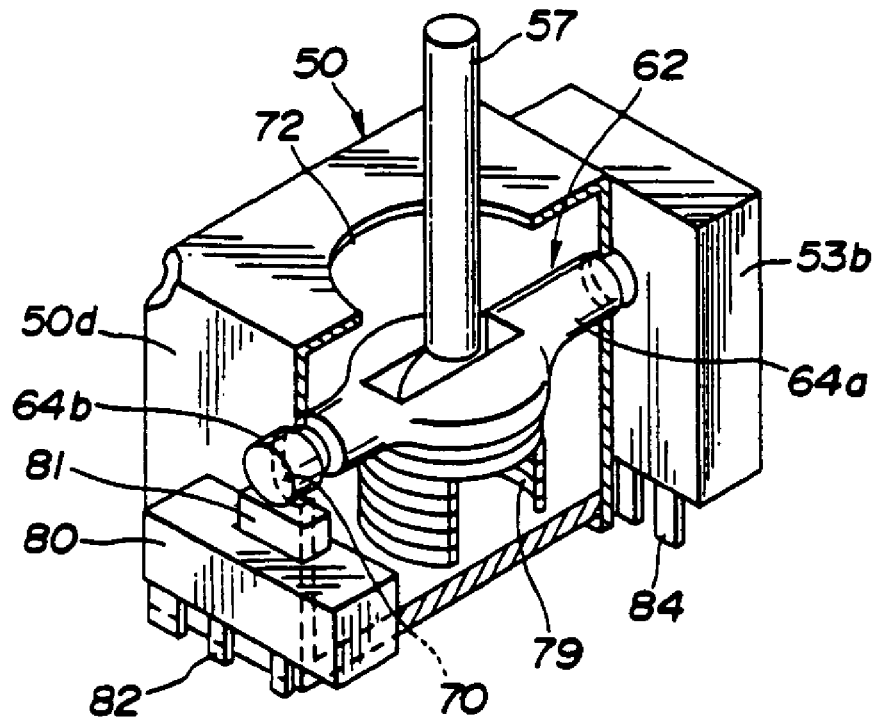
FIG. 17 is a cross-sectional view showing the multi-directional input device showing the state of operating a thrusting type switch element.
Figure 18:
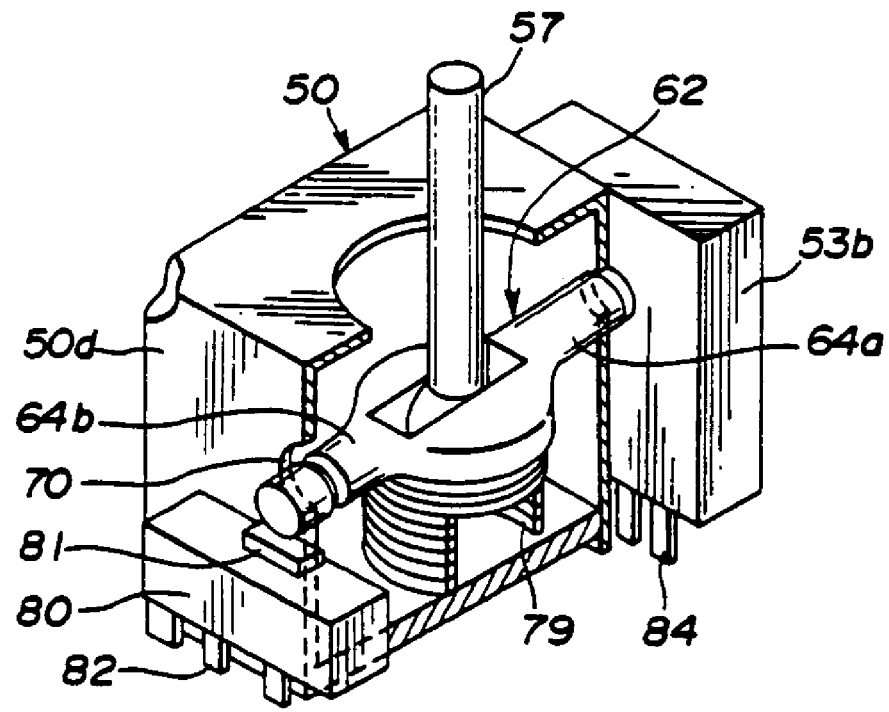
FIG. 18 is a cross-sectional view showing the multi-directional input device showing the state of the thrusting type switch element having been operated.
Figure 19:
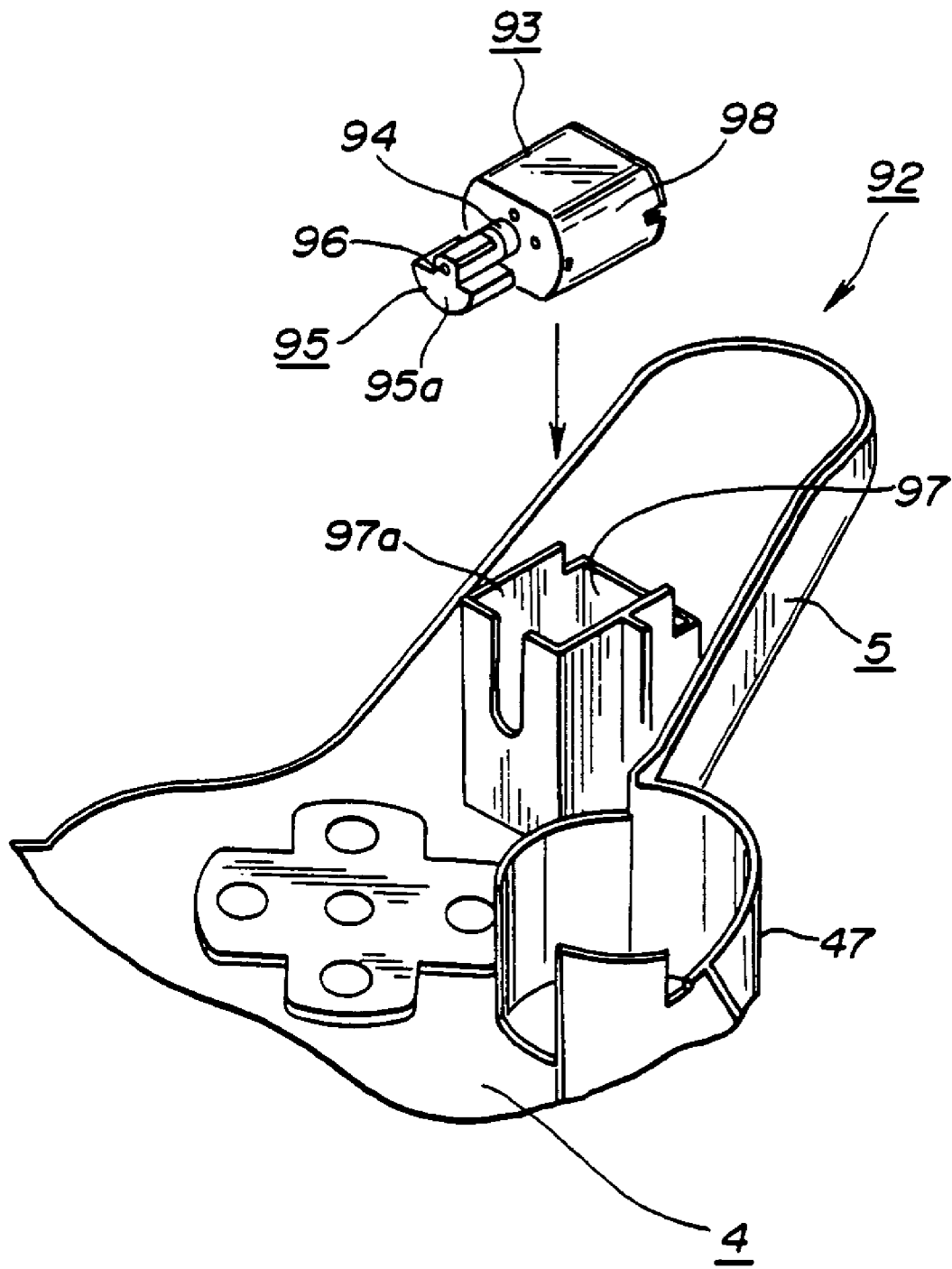
FIG. 19 is an exploded perspective view showing a vibration imparting mechanism.
Figure 20:
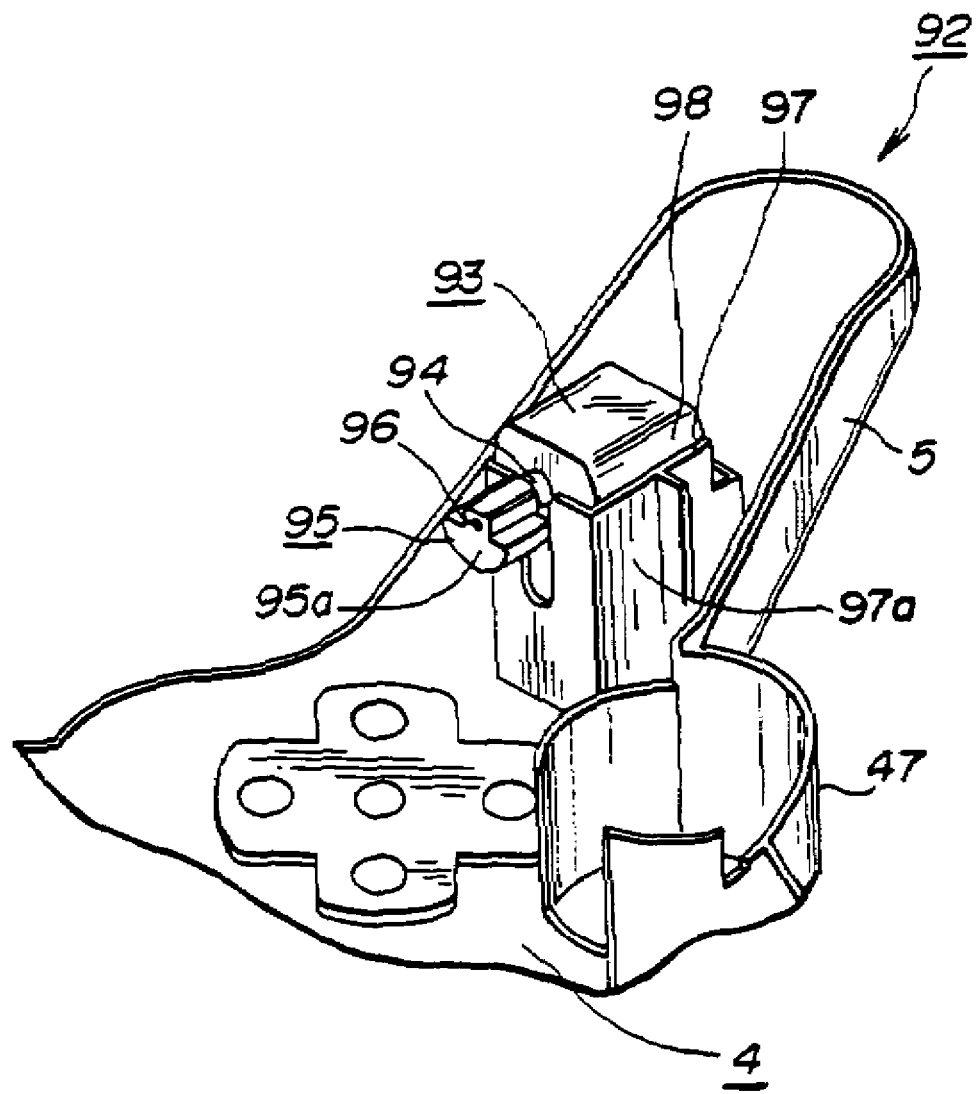
FIG. 20 is a perspective view showing the state in which the vibrating imparting mechanism has been built in the main body portion of the game machine.

The operation of the switch device 80 is explained by referring to FIGS. 17 and 18.

In the non-operating state, the operating shaft 57 is in the position shown in FIG. 17 in which the end of the arm 64b of the second interlock member 62 is spaced apart from the thrusting operator 51 of the switch device 80, with the end of the arm 64b being pressed against the upper edge of the elongated opening 70 in the lateral side 50d of the frame 50. If the operating shaft 57 is pressed downwards from this state, the end of the arm 64b of the second interlock member 62 is moved downwards along the elongated opening 70, against the force of the return spring 79, with the engagement point of the arm 64a with the rotary shaft 54 of the variable resistor 53b as a fulcrum, until the end of the arm 64b is retained by the lower edge of the elongated opening 70 operating as a stop. In the interim, the end of the arm 64b thrusts the thrusting operator 81 of the switch device 80 downwards for changing over the state of the switch device 80. If the thrusting on the operating shaft 57 ceases, the end of the arm 64b is reset to the state shown in FIG. 17, under the force of repulsion of the return spring 79, with the end of the arm 64b being reset to the state of FIG. 17 in which it is abutted against the upper edge of the elongated slot 70. Meanwhile, the switch device 80 is operated even if the operating shaft 57 is thrust downwards when the actuating shaft 57 has been rotated in an optional direction.

Thus, by rotating the rotation member 16 for actuating the first and second variable resistors 53a, 53b, the third and fourth operators 14, 15 can issue the command information of continuously moving the display character with an accelerated movement, rotating the display character as it is advanced or varying the line of sight of the display character.

The fifth and sixth operating units 17, 18 arranged on the front side of the main body portion 4 are now explained.

The fifth and sixth operators 17, 18 are designed so that the first and second thrusting operators 19a, 19b, 20a, 20b arranged on both sides on the front side of the main body portion 4 protrude at the distal ends thereof from the front surface of the main body portion 4 through upper and lower pairs of apertures 91 arranged parallel to each other. Within the main body portion 4 are arranged switch devices in association with these thrusting operators 19a, 19b and 20a, 20b.

The operating device 1 of the present invention is provided with a vibration imparting mechanism 92 for imparting vibrations to the user so that the game will be played with a higher simulated reality feeling. This vibration imparting mechanism 92 is provided on the proximal end of the first grip portion 5 held by the left hand when the user grips the operating device 1. This vibration imparting mechanism 92 is made up of a driving motor 93 driven by a driving command signal supplied from the main body portion of the game machine and an offset member 95 mounted on a driving shaft 94 of the driving motor 93. The offset member 95 is formed by a metallic member of a large weight mass to constitute a semi-circular weight 95a offset with respect to a fitting hole 96 into which is fitted the driving shaft 94 and which operates as a center of rotation. The driving motor 93, having the offset member 95 mounted on the driving shaft 94, is mounted by fitting the motor housing 98 in a fitting recess 97 in the form of a rectangular tube on the inner side of the first grip portion 5.

With the vibration imparting mechanism 92 constructed as described above, the driving motor 93 is driven for rotating the offset member 95, so that the driving motor 93 undergoes vibrations. These vibrations are transmitted via a peripheral wall section 97a constituting the fitting recess 97 to the first grip portion 5 and thence transmitted to the hands and fingers gripping the grip portion 5.

The vibration imparting mechanism 92 may also be provided on the second grip portion 6.

Figure 21:
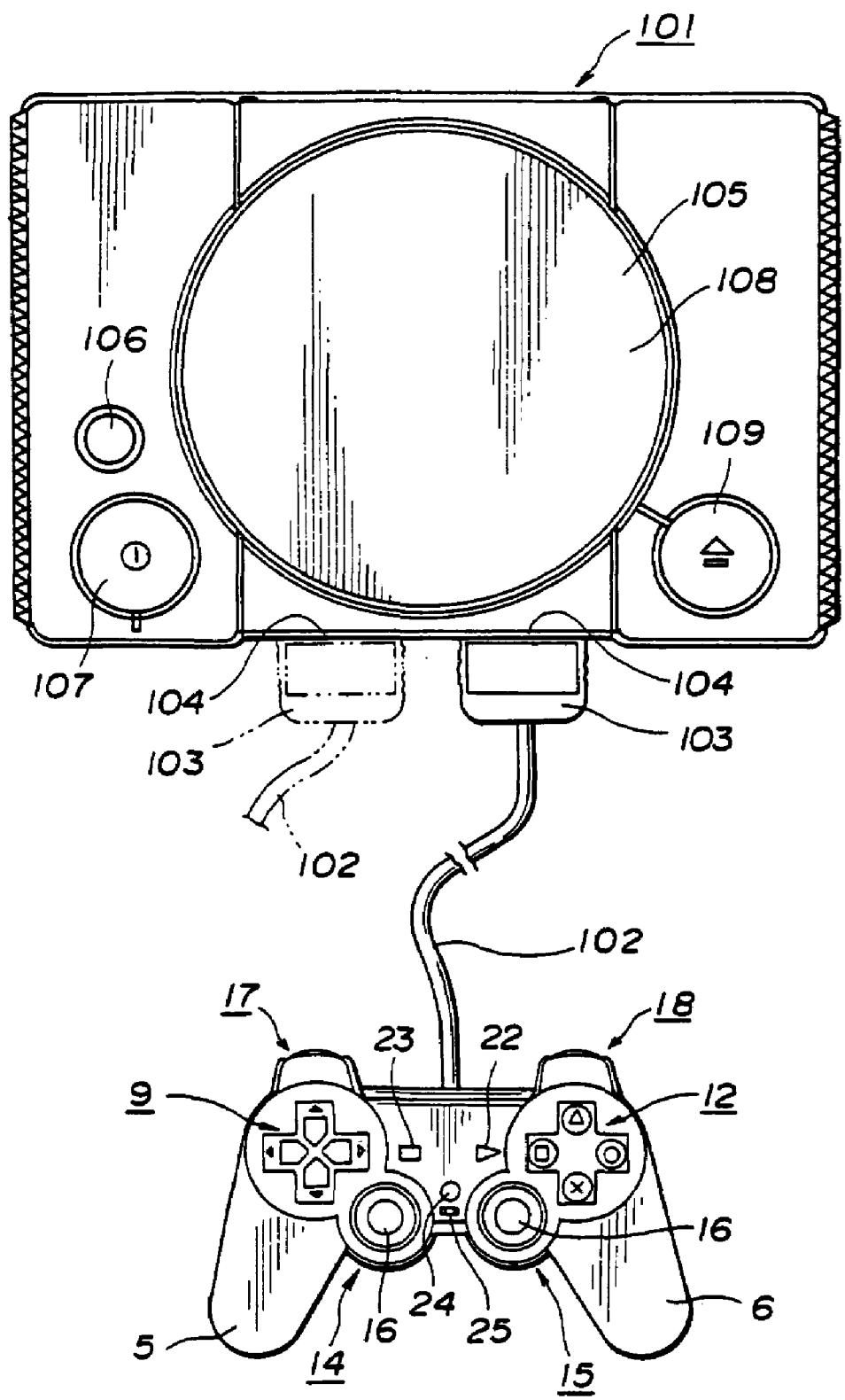
FIG. 21 is a plan view showing the state in which the operating device for the game machine according to the present invention has been connected to the main body portion of the game machine.

The above-described operating device 1 for the game machine according to the present invention is connected to a main body portion 101 of the game machine, as shown in FIG. 21.

The operating device 1 is connected to the main body portion 101 of the game machine by a connection cord 102 extending from the mid portion on the front side of the main body portion 4. This connection cord 102 has an end connector 103 which connects the operating device 1 to the main body portion 101 of the game machine by connecting the connector 103 to a jack 104 provided on a lateral surface of the main body portion 101 of the game machine.

The main body portion 101 of the game machine is provided with plural jacks 104 for connection to plural operating devices 1.

The main body portion 101 of the game machine is provided with a disc driving unit 105 for reproducing an optical disc having recorded thereon game programs and a picture processing device for displaying the display character along with the background picture on a screen of a television receiver in accordance with the game program recorded on the optical disc. The main body portion 101 of the game machine is also provided with a reset switch 106 for resetting the game then going on, a power switch 107 and a lid opening button 109 for opening a lid 108 adapted for opening/closing a disc mounting portion of the disc driving unit.

The main body portion 101 of the game machine is connected to a television receiver as a display device for displaying the display character along with a background picture for the game.

With the above-described operating device 1 for the game machine according to the present invention, the user can operate the first to sixth operating units 9, 12, 14, 15, 17 or 18, using ten fingers at the maximum, as the first and second grip portions 5, 6 are held with both hands. The operating device for the game machine can also be operated with only one of the first and second grip portions 5, 6 gripped. That is, by properly actuating the first to sixth operating units 9, 12, 14, 15, 17 or 18, not only can the display character be moved horizontally, but also the display character can be rotated or moved with accelerated movements in meeting with the game with the three-dimensional spatial picture. Moreover, since vibrations can be imparted to the user, the game can be played with excellent simulated reality feeling.

Thus, by using the operating device 1 for the game machine according to the present invention, the display character can perform complex movements to carry out a game program with improved simulated reality feeling. For example, such a game can be played in which an airplane or a submarine is moved through a three-dimensional spacing.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An operating device for a game machine, comprising:
a main body;
first and second grips protruding at spaced positions from the main body;
a first operating unit mounted to the main body adjacent one of the spaced positions, the first operating unit having an input element operable to generate a signal;
a second operating unit mounted to the main body adjacent another one of the spaced positions, the second operating unit having an input element operable to generate a signal;
third and fourth operating units mounted to the main body, the third operating unit being positioned adjacent the first operating unit and having an input element operable to generate a signal, and the fourth operating unit being positioned adjacent the second operating unit and having an input element operable to generate a signal; and
a vibration-imparting unit arranged in at least one of the first and second grips.

2. An operating device for a game machine, comprising:
a main body;
first and second grips protruding at spaced positions from the main body;
a first operating unit mounted to the main body adjacent one of the spaced positions, the first operating unit having an input element operable to generate a signal;
a second operating unit mounted to the main body adjacent another one of the spaced positions, the second operating unit having an input element operable to generate a signal;
third and fourth operating units mounted to the main body so as to be positioned between the first and second grips, each of the third and fourth operating units having an input element operable to generate a signal; and a vibration-imparting unit arranged in at least one of the first and second grips.

3. An operating device for a game machine, comprising:

a main body;

first and second grips protruding at spaced positions from the main body;

a first operating unit mounted to the main body adjacent one of the spaced positions, the first operating unit having an input element operable to generate a signal;

a second operating unit mounted to the main body adjacent another one of the spaced positions, the second operating unit having an input element operable to generate a signal;

third and fourth operating units mounted to the main body, the third operating unit being positioned adjacent the one of the spaced positions and having an input element operable to generate a signal, and the fourth operating unit being positioned adjacent the another one of the spaced positions and having an input element operable to generate a signal; and a vibration-imparting unit arranged in at least one of the first and second grips.

4. An operating device for a game machine, comprising:

a main body having front and rear sides;

first and second grips protruding at spaced positions from the rear side of the main body;

a first operating unit mounted to the main body adjacent one of the spaced positions, the first operating unit having an input element operable to generate a signal;

a second operating unit mounted to the main body adjacent another one of the spaced positions, the second operating unit having an input element operable to generate a signal;

third and fourth operating units mounted to the main body, each of the third and fourth operating units having an input element operable to generate a signal, the third and fourth operating units projecting from the main body between the first and second grips; and a vibration-imparting unit arranged in at least one of the first and second grips.

5. An operating device for a game machine, comprising:

a main body;

first and second grips protruding at spaced positions from the main body;

a first operating unit mounted to the main body adjacent one of the spaced positions, the first operating unit having an input element operable to generate a signal;

a second operating unit mounted to the main body adjacent another one of the spaced positions, the second operating unit having an input element operable to generate a signal;

a third operating unit projecting from the first operating unit to a position between the first and second grips, the third operating unit having an input element operable to generate a signal;

a fourth operating unit projecting from the second operating unit to a position between the first and second grips, the fourth operating unit having an input element operable to generate a signal; and a vibration-imparting unit arranged in at least one of the first and second grips.

6. An operating device for a game machine, comprising:

a main body;

first and second grips protruding at spaced positions from the main body;

a first operating unit mounted to the main body adjacent one of the spaced positions, the first operating unit having an input element operable to generate a signal;

a second operating unit mounted to the main body adjacent another one of the spaced positions, the second operating unit having an input element operable to generate a signal;

third and fourth operating units mounted to the main body, the third operating unit being positioned adjacent the first grip and having an input element operable to generate a signal, and the fourth operating unit being positioned adjacent the second grip and having an input element operable to generate a signal; and a vibration-imparting unit arranged in at least one of the first and second grips.

7. A game machine, comprising:

a main unit for reading a game program; and an operating device interconnected with the main unit, the operating device including:

a main body;

first and second grips protruding at spaced positions from the main body;

a first operating unit mounted to the main body adjacent one of the spaced positions, the first operating unit having an input element operable to generate a signal;

a second operating unit mounted to the main body adjacent another one of the spaced positions, the second operating unit having an input element operable to generate a signal;

third and fourth operating units mounted to the main body, the third operating unit being positioned adjacent the first operating unit and having an input element operable to generate a signal, and the fourth operating unit being positioned adjacent the second operating unit and having an input element operable to generate a signal; and a vibration-imparting unit arranged in at least one of the first and second grips.

8. A game machine, comprising:

a main unit for reading a game program; and an operating device interconnected with the main unit, the operating device including:

a main body;

first and second grips protruding at spaced positions from the main body;

a first operating unit mounted to the main body adjacent one of the spaced positions, the first operating unit having an input element operable to generate a signal;

a second operating unit mounted to the main body adjacent another one of the spaced positions, the second operating unit having an input element operable to generate a signal;

third and fourth operating units mounted to the main body so as to be positioned between the first and second grips, each of the third and fourth operating units having an input element operable to generate a signal; and a vibration-imparting unit arranged in at least one of the first and second grips.

9. A game machine, comprising:

a main unit for reading a game program; and an operating device interconnected with the main unit, the operating device including:
- a main body;
- first and second grips protruding at spaced positions from the main body;
- a first operating unit mounted to the main body adjacent one of the spaced positions, the first operating unit having an input element operable to generate a signal;
- a second operating unit mounted to the main body adjacent another one of the spaced positions, the second operating unit having an input element operable to generate a signal;
- third and fourth operating units mounted to the main body, the third operating unit being positioned adjacent the one of the spaced positions and having an input element operable to generate a signal, and the fourth operating unit being positioned adjacent the another one of the spaced positions and having an input element operable to generate a signal; and
- a vibration-imparting unit arranged in at least one of the first and second grips.

10. A game machine, comprising:

a main unit for reading a game program; and an operating device interconnected with the main unit, the operating device including:
- a main body having front and rear sides;
- first and second grips protruding at spaced positions from the rear side of the main body;
- a first operating unit mounted to the main body adjacent one of the spaced positions, the first operating unit having an input element operable to generate a signal;
- a second operating unit mounted to the main body adjacent another one of the spaced positions, the second operating unit having an input element operable to generate a signal;
- third and fourth operating units mounted to the main body, each of the third and fourth operating units having an input element operable to generate a signal, the third and fourth operating units projecting from the main body between the first and second grips; and
- a vibration-imparting unit arranged in at least one of the first and second grips.

11. A game machine, comprising:

a main unit for reading a game program; and an operating device interconnected with the main unit, the operating device including:
- a main body;
- first and second grips protruding at spaced positions from the main body;
- a first operating unit mounted to the main body adjacent one of the spaced positions, the first operating unit having an input element operable to generate a signal;
- a second operating unit mounted to the main body adjacent another one of the spaced positions, the second operating unit having an input element operable to generate a signal;
- a third operating unit projecting from the first operating unit to a position between the first and second grips, the third operating unit having an input element operable to generate a signal;
- a fourth operating unit projecting from the second operating unit to a position between the first and second grips, the fourth operating unit having an input element operable to generate a signal; and
- a vibration-imparting unit arranged in at least one of the first and second grips.

12. A game machine, comprising:

a main unit for reading a game program; and an operating device interconnected with the main unit, the operating device including:
- a main body;
- first and second grips protruding at spaced positions from the main body;
- a first operating unit mounted to the main body adjacent one of the spaced positions, the first operating unit having an input element operable to generate a signal;
- a second operating unit mounted to the main body adjacent another one of the spaced positions, the second operating unit having an input element operable to generate a signal;
- third and fourth operating units mounted to the main body, the third operating unit being positioned adjacent the first grip and having an input element operable to generate a signal, and the fourth operating unit being positioned adjacent the second grip and having an input element operable to generate a signal; and
- a vibration-imparting unit arranged in at least one of the first and second grips.

* * * * *